US012358252B2

(12) United States Patent
Faretra et al.

(10) Patent No.: US 12,358,252 B2
(45) Date of Patent: Jul. 15, 2025

(54) APPARATUS FOR CONTINUOUS PRODUCTION OF TAILORED, PRE-FOLDED BLANKS OF CORRUGATED CARDBOARD

(71) Applicant: BESTBOXIT INC., Raleigh, NC (US)

(72) Inventors: Marco Faretra, Longiano (IT); Gino Bassi, San Giovanni in Persiceto (IT)

(73) Assignee: BESTBOXIT INC., Raleigh, NC (US)

( * ) Notice: Subject to any disclaimer, the term of this patent is extended or adjusted under 35 U.S.C. 154(b) by 6 days.

(21) Appl. No.: 18/554,757

(22) PCT Filed: Mar. 25, 2022

(86) PCT No.: PCT/IB2022/052734
§ 371 (c)(1),
(2) Date: Oct. 10, 2023

(87) PCT Pub. No.: WO2022/219437
PCT Pub. Date: Oct. 20, 2022

(65) Prior Publication Data

US 2024/0190099 A1 Jun. 13, 2024

(30) Foreign Application Priority Data

Apr. 13, 2021 (IT) ........................ 102021000009263

(51) Int. Cl.
*B31B 50/00* (2017.01)
*B31B 50/20* (2017.01)
(Continued)

(52) U.S. Cl.
CPC .......... *B31B 50/006* (2017.08); *B31B 50/002* (2017.08); *B31B 50/20* (2017.08);
(Continued)

(58) Field of Classification Search
CPC ... B31B 50/002; B31B 50/006; B31B 50/024; B31B 50/20; B31B 50/25; B31B 50/52;
(Continued)

(56) References Cited

U.S. PATENT DOCUMENTS 2,774,286 A 12/1956 Bombard
6,357,212 B1 3/2002 Salm
(Continued)

FOREIGN PATENT DOCUMENTS

GB 1210263 A 10/1970
IT 102017000066129 6/2017
(Continued)

OTHER PUBLICATIONS

International Search Report dated Jun. 27, 2022 from counterpart PCT App No. PCT/IB2022/052734.

*Primary Examiner* — Eyamindae C Jallow
(74) *Attorney, Agent, or Firm* — SHUTTLEWORTH & INGERSOLL, PLC; Timothy J. Klima

(57) ABSTRACT

An apparatus for production of corrugated cardboard pre-folded blanks includes: a frame defining a working plane; a feeding unit which receives a cardboard sheet and moves it in a longitudinal direction on the working plane; a sensor unit for detecting input data regarding the size of an item to be packed; a control unit which receives and processes the input data to generate a setting for the apparatus; a plurality of cutters and creasers to make cuts and folding lines on the cardboard sheet to form the blank; a plurality of actuators moving the cutters and the creasers relative to the frame based on the setting; a glue applicator for applying a strip of glue on a portion of the blank; a folding unit having first and second folding hands for folding front and rear flaps of the blank to overlap and be attached by the glue strip.

22 Claims, 7 Drawing Sheets

(51) Int. Cl.

| | |
|---|---|
| ***B31B 50/25*** | (2017.01) |
| ***B31B 50/26*** | (2017.01) |
| ***B31B 50/52*** | (2017.01) |
| ***B31B 50/62*** | (2017.01) |
| *B31B 100/00* | (2017.01) |
| *B31B 110/35* | (2017.01) |
| *B31B 120/30* | (2017.01) |

(52) U.S. Cl.
CPC ............ *B31B 50/25* (2017.08); *B31B 50/262* (2017.08); *B31B 50/52* (2017.08); *B31B 50/624* (2017.08); *B31B 2100/0024* (2017.08); *B31B 2110/35* (2017.08); *B31B 2120/302* (2017.08)

(58) Field of Classification Search
CPC .......... B31B 50/262; B31B 2100/0024; B31B 2110/35; B31B 2021/302
See application file for complete search history.

(56) References Cited

U.S. PATENT DOCUMENTS

| | | | | |
|---|---|---|---|---|
| 9,962,895 | B2 | 5/2018 | Ponti | |
| 10,857,752 | B2 | 12/2020 | Ponti | |
| 12,060,182 | B2 * | 8/2024 | Ponti | B65B 5/024 |
| 2016/0243784 | A1 | 8/2016 | Ishizuka | |
| 2017/0361560 | A1 * | 12/2017 | Osterhout | B31B 50/81 |
| 2018/0086019 | A1 * | 3/2018 | Langen | B31B 50/26 |
| 2018/0201465 | A1 * | 7/2018 | Osterhout | B65H 45/1015 |
| 2018/0215485 | A1 | 8/2018 | Koet | |
| 2019/0308761 | A1 * | 10/2019 | Provoost | B65B 5/06 |

FOREIGN PATENT DOCUMENTS

| | | | | |
|---|---|---|---|---|
| IT | 102018000008258 | | 8/2018 | |
| WO | WO-2016203343 | A1 * | 12/2016 | B31B 50/006 |
| WO | 2017182901 | A1 | 10/2017 | |
| WO | 2017203392 | A1 | 11/2017 | |
| WO | 2020178015 | A2 | 9/2020 | |

* cited by examiner

APPARATUS FOR CONTINUOUS PRODUCTION OF TAILORED, PRE-FOLDED BLANKS OF CORRUGATED CARDBOARD

This application is the National Phase of International Application PCT/IB2022/052734 filed Mar. 25, 2022 which designated the U.S.

This application claims priority to Italian Patent Application No. 102021000009263 filed Apr. 13, 2021, which applications are incorporated by reference herein.

This invention relates to an apparatus for continuous production of pre-folded blanks of corrugated cardboard, where each blank can be tailored for a respective item to be packed. This invention also relates to a method for processing a corrugated cardboard sheet to produce pre-folded blanks, where each blank can be tailored for a respective item to be packed.

Corrugated cardboard boxes are widely used in the transport and packaging sector where a sheet of cardboard is folded around an item to be packed. In many cases, cartoning machines are used to process the corrugated cardboard to obtain cardboard blanks.

As is known, a cartoning machine is a machine tool used to perform cutting, creasing and intermittent cutting processes on the cardboard in order to make blanks which are subsequently folded and erected to obtain packaging boxes.

In the cardboard processing industry, continuously fed cartoning machines are known which offer the possibility of performing the above mentioned processes in two substantially orthogonal directions. These directions belong to a working plane defined by the supporting surface on which the cardboard rests. The directions correspond to the longitudinal direction of cardboard feed and the transversal direction, orthogonal to the longitudinal one and belonging to the supporting surface.

For example, patent document IT102017000066129 describes a cartoning machine capable of making a plurality of cuts and creases on the corrugated cardboard to make a cardboard blank.

The cardboard blanks made by the cartoning machines must then be folded to form packaging boxes. Typically, this task is done by a worker who receives the blanks as they feed out of the machine, folds them and glues them.

In this sector, there is an ever growing demand for an apparatus that is as compact as possible and capable of reducing the load of manual labour in order to facilitate the process of producing cardboard blanks and folding and gluing the cardboard blanks to obtain boxes.

Moreover, in the e-commerce packaging industry, a very large number of items of different sizes need to be packed in succession. Therefore, the cartoning machine must also be able to produce blanks of different sizes in succession and tailored to suit each item to be packed; in effect, the ability of the machines to adapt to continual changes in the size of the items to be packed helps reduce cardboard consumption and saves box shipping space.

In this context, patent document IT102018000008258 describes an apparatus for producing tailor-made boxes from a roll of cardboard to make boxes suitable for each single item to be packed. This patent document, however, is focused on saving cardboard but does not provide a solution to the problem of saving workers' time and reducing the size of the apparatus.

The need therefore remains for cartoning machines that are capable of continuously producing cardboard blanks tailored to respective items to be packed and that are particularly fast and require limited human intervention.

The aim of this disclosure is to provide an apparatus and a method for continuous production of corrugated cardboard blanks to overcome the above mentioned disadvantages of the prior art.

More specifically, the aim of this disclosure is to provide an apparatus and a method that are capable of cutting, creasing and folding a sheet of cardboard to make tailored, pre-folded cardboard blanks in a particularly precise and fast manner, while keeping the overall dimensions of the apparatus as limited as possible.

This aim is fully achieved by the apparatus and method of this disclosure as characterized in the appended claims.

According to an aspect of it, this disclosure provides an apparatus for continuous production of tailored, pre-folded and glued blanks of corrugated cardboard from a sheet of cardboard.

The apparatus of this disclosure is configured to receive cardboard from one or more cardboard reservoirs. Preferably, the cardboard is corrugated (that is, shaped in alternate ridges and grooves).

The reservoir from which the apparatus receives the cardboard may be of the fanfold type (a continuous sheet of corrugated cardboard where portions of the sheet are folded on top of one another); alternatively, the cardboard reservoir may be a roll where the sheet of cardboard is wound substantially spirally.

The apparatus comprises a frame. In an embodiment, the frame defines a working plane on which the cardboard is disposed during processing. In a preferred embodiment, the working plane is parallel to the ground (that is to say, it is horizontal). Alternatively, the working plane might be inclined at an angle to the ground.

The apparatus comprises a feeding unit. The feeding unit is configured to receive, at a loading section, a corrugated cardboard sheet from a cardboard reservoir. The feeding unit is configured to move the cardboard sheet forward in a longitudinal direction, advancing it on the working plane in an advancing direction.

The term "advancing direction" refers to the movement performed by the cardboard in the apparatus; first, an end portion of the cardboard sheet contained in the reservoir is pulled (into the loading section) and advanced towards the zone of the apparatus where that portion of the sheet is processed to form the blank and the blank is then separated from the rest of the sheet; next, the blank is advanced into another zone of the apparatus where the blank is folded and glued (or pre-folded).

To move the sheet into the loading station, the feeding unit comprises conveyor rollers, for example.

To move the blank in the advancing direction, the feeding unit comprises suction belts or other systems, for example.

Inside the apparatus, the cardboard is moved intermittently, advancing and stopping alternately.

The apparatus comprises a control unit. The control unit may be configured to receive input data representative of the size (length, width and height) of the item to be packed. In this case, the control unit may be configured to process the input data to derive a setting for the apparatus, responsive to the input data.

In an embodiment, the apparatus comprises a conveyor for conveying the items to be packed. The apparatus may also comprise a sensor unit, preferably coupled to the conveyor, configured to capture size information about the item to be packed. In an embodiment, the size information may include a length and/or a width and/or a height of each item conveyed. The sensor unit is connected to the control unit. The sensor unit is configured to provide the control unit with input data responsive to the size information. For example, the sensor unit includes one or more sensors or a vision system. Alternatively, input data entry may be performed by an operator who, after obtaining the measured input data, enters them manually into the control unit.

The apparatus comprises a plurality of cutters. The plurality of cutters is coupled to the frame. The cutters of the plurality of cutters have the function of making cuts on the cardboard sheet to obtain the blank. One or more of the cutters of the plurality of cutters are movable transversally to make transversal cuts. To make the longitudinal cuts, the apparatus produces a relative longitudinal movement between the cardboard and one or more of the cutters; in an example, during longitudinal cutting, the cutters remain stationary while the cardboard advances longitudinally; alternatively, one or more of the cutters might perform the longitudinal movement. The plurality of cutters is configured to move (for example, transversally) relative to the frame, based on the setting of the apparatus, so that the cardboard sheet is cut to form a blank of the required size. Based on the input data, the control unit prepares for processing a further portion of the sheet by determining a movement of one or more of the cutters to positions derived in response to the input data; therefore, the control unit, based on the input data, determines and updates the apparatus setting (substantially in real time).

The blank has a front end and a rear end spaced from each other along a longitudinal axis of the blank.

The plurality of cutters may also include a cutting device for cutting strips of cardboard out of the cardboard sheet (this operation is also known as slitting).

The apparatus comprises a plurality of creasers. The plurality of creasers is coupled to the frame. In an example, the plurality of creasers comprises a pair of longitudinal creasers and one transversal creaser. The plurality of creasers is configured to generate crease lines in the cardboard. The plurality of creasers is configured to move in relation to the cardboard, based on the apparatus setting, to generate a plurality of folding lines on the blank. In an example embodiment, the pair of longitudinal creasers is movable at least in a transversal direction responsive to the apparatus setting. In this solution, the transversal creaser is in a fixed position and is movable orthogonally to the working plane from a raised position to a lowered position.

In an example, at least one (preferably each) creaser of the plurality of creasers is movable between a plurality of working positions at different distances from the working plane so that the distance of the creaser from the working plane can be adjusted. This solution allows obtaining folding lines whose depth is suitable for the thickness of the cardboard sheet.

In other words, at least one of the creasers of the plurality of creasers (preferably at least the transversal creaser but still more preferably, the longitudinal creasers, too) is adjustably positionable in a plurality of working positions. That way, the creaser is lowered to a predetermined height (automatically or by a manually operable adjuster) to penetrate the cardboard to a settable creasing depth (less than the thickness of the cardboard and commensurate with the thickness of the cardboard); thus, the possible working positions of the creaser have different distances from the working plane so that when the creaser is in the working position its height can be varied to adjust the depth of the crease as a function of the thickness of the cardboard being used.

In an example embodiment, the apparatus comprises an actuator (for each creaser) configured to move the creaser between the different possible working positions in order to set it to the working position. The actuator is driven (controlled) by the control unit of the apparatus, which is programmed to set the working position of the creaser responsive to the thickness of the cardboard (specified, for example, in the input data received by the control unit). For example, the transversal creaser (which is preferably attached to the cutting devices) is controlled by an actuator (for example, a brushless motor) to set and adjust the height of the lowered position (minimum height) of the creaser, which defines its working position; preferably, this adjustment is performed automatically by the control unit as a function of the data received (if the thickness of the cardboard increases after a format changeover, the creaser must stop at a greater height).

As regards the longitudinal creasers, adjustment of the working position is, in an example embodiment, performed manually using a knob or other adjustment element, which acts on a limit stop of an actuator to determine the stopping depth of the creaser. In another example, the actuator of each longitudinal creaser might be controllable or settable automatically by the control unit as a function of the data received (relating to the thickness of the cardboard).

In an embodiment, the apparatus comprises a plurality of actuators. The actuators of the plurality of actuators have the function of moving the cutters and creasers. The plurality of actuators is also connected to the control unit and is configured for positioning the cutters and the creasers on the cardboard sheet relative to the frame, responsive to the input data (according to the apparatus setting).

In an example embodiment, the plurality of folding lines of the blank comprises four folding lines. The plurality of folding lines made by the creasers comprises a first and a second folding line, oriented transversally to the longitudinal axis and spaced longitudinally from each other. In an example, the first folding line corresponds to the folding line in proximity to the rear end of the blank and the second folding line corresponds to the folding line in proximity to the front end of the blank.

The apparatus comprises a folding unit. The folding unit comprises a first folding hand and a second folding hand. The first folding hand and the second folding hand are configured for folding a rear flap and a front flap of the blank, respectively. The rear flap and the front flap are folded over a central portion of the blank made up of two flaps.

The rear flap and the front flap are folded so that at least a tab of the front flap and at least part of the rear flap are overlapped.

The apparatus comprises a glue applicator. The glue applicator is configured to apply a strip of glue on a portion of the blank. More specifically, the glue applicator is configured to apply a strip of glue in such a way that the tab of the front flap is attached to the rear flap by the glue strip.

Preferably, the glue applicator is configured to apply the glue strip simultaneously with the transversal movement of the separating cutter that separates the blank from the rest of the sheet. This solution makes the apparatus less cumbersome and allows increasing process speed. Alternatively, applying the glue and separating the blank may be carried out in two separate steps.

The first folding hand is preferably positioned upstream of the second folding hand relative to the advancing direction of the cardboard.

In an example, the first folding hand and the second folding hand are configured to fold the rear flap and the front flap of the blank onto the central portion of the blank, respectively, so that the front flap and the rear flap, in the pre-folded blank, overlap the central portion and are in contact with the central portion.

In an example, the folding hands are rotating parts. In this example, the first folding hand and the second folding hand rotate about a first folding axis and a second folding axis, respectively. The folding axes are oriented transversally to the longitudinal direction.

In another example, the folding hands might be non-rotating parts. In this solution, the flaps of the blank are folded in two steps. In the first step, the flaps are lifted, for example by a first element which is coupled to the frame and which moves upwards orthogonally to the working plane. In the second step, a second element, which moves in the longitudinal direction, parallel to the ground, folds the flaps of the blank.

In an example, the first folding hand and the second folding hand are reciprocally movable. The hands are movable to vary the distance between the first and the second folding axis along the longitudinal direction. This solution allows adjusting the distance between the folding axes for blanks of different sizes and folding the front flap and the rear flap one after the other. Alternatively, the folding hands may both be stationary relative to the frame.

The apparatus may also comprise a distance actuator configured to vary the distance between the first and the second folding axis. The control unit is connected to the distance actuator and is programmed to derive an operating distance, based on the input data. The control unit is configured to generate a command signal for the distance actuator to move the first and the second folding hand according to the operating distance. By "operating distance" is meant the distance between the first folding hand and the second folding hand, where the first and the second folding axis are positioned in proximity to the folding lines of the blank.

The apparatus may comprise a sensor configured to detect positioning information responsive to a position of the blank with respect to the frame. The sensor is configured to send the positioning information to the control unit. In this example, the control unit is programmed to command the feeding unit to stop the blank in a folding position, responsive to the positioning information. The term "folding position" is used to refer to a position where the first folding line and the second folding line of the blank are placed in a predetermined position with respect to the first and the second folding axis, respectively.

In another example, the apparatus may be without a sensor. In this solution, the control unit is configured to stop the blank in a predetermined position and to generate a command signal to move the folding axes based on the input data (the size of the blank).

Preferably, the first folding axis is movable with respect to the frame to translate longitudinally and the second folding axis is stationary with respect to the frame, or vice versa. This solution allows reducing the use of control elements.

The apparatus may comprise a first and a second pusher. In this case, the first pusher cooperates with the first folding hand and is configured to lift the rear flap of the blank; the second pusher cooperates with the second folding hand and is configured to lift the front flap of the blank. In this example, the first pusher is located upstream of the first folding axis and the second pusher is located downstream of the second folding axis. This solution is advantageous in that it prevents wrong folding of the flaps due to the presence of spurious folding lines on the cardboard sheet (for example, in the case where the cardboard reservoir is of the fanfold type).

The apparatus may also comprise a spreading-out element. The spreading-out element is movable transversally and is configured to push the front flap of the blank downwards so as to keep it spread out flat in a plane, should it be in a folded position. The spreading-out element is configured to ensure that the front flap of the blank is spread out on the working plane so that the sensor can detect the position of the flap with respect to the frame.

In an example, the apparatus comprises one or more holders, configured to prevent the central portion of the blank from lifting with respect to the working plane. In this case, the holders cooperate with the first and second folding hands. The holders are located between the first and the second folding hand.

The apparatus may comprise a finger configured for holding the front flap of the blank to prevent the front flap from unfolding when the second folding hand is spaced apart from the front flap.

The apparatus may also comprise a tongue configured to interact with the cardboard sheet advancing along the working plane. The tongue is coupled to the frame and is elastically deformable. The tongue is configured to push down the cardboard offcuts produced by one or more of the cutters of the plurality of cutters.

According to an aspect of it, this disclosure also provides a method for processing a corrugated cardboard sheet to produce pre-folded, glued blanks, where each blank can be tailored for a respective item to be packed.

The method comprises a step of providing a plurality of cutters for cutting the cardboard sheet into the desired blank, and a plurality of creasers for making a corresponding plurality of folding lines in the blank.

The method comprises a step of receiving input data at a control unit and a step of generating a setting for the apparatus. The input data may be representative of the size of the item to be packed (a length and a width and a height).

The method comprises a step of positioning the cutters and the creasers with respect to the frame, responsive to the apparatus setting.

The method comprises a step of loading the cardboard sheet from a cardboard reservoir. The method also comprises moving the cardboard sheet on a working plane in a longitudinal direction. The working plane is preferably parallel to the ground.

The method comprises a step of activating the cutters and the creasers on the cardboard sheet, so that the blank is provided with a rear flap and a front flap, spaced along a longitudinal axis of the blank, and with a central portion, interposed between the rear flap and a front flap and delimited therefrom by a first and second folding line, respectively. The first and second folding lines are oriented transversally with respect to the longitudinal axis of the blank. In an example, the central portion includes a first flap and a second flap. The first flap and the second flap of the central portion are separated from each other by a third folding line. The third folding line is parallel to the first and second folding lines. The method may comprise a step of applying a strip of glue on a portion of the blank. The method may comprise a step of moving the blank towards a flap folding zone by means of a suction belt, for example.

The method comprises step of folding the rear flap and the front flap. Preferably, the flaps are folded by rotating them about the first and the second folding line, respectively, so that the rear flap and the front flap are folded onto the central portion and the tab of the front flap and the rear flap are attached to each other by the glue strip.

In an example, the rear flap and the front flap are folded on the central portion so that the front flap and the rear flap contact the central portion of the blank in order to form the pre-folded blank. The pre-folded blank is flat.

The method may also comprise a step of releasing the pre-folded blank at an outlet of the apparatus.

The method may comprise a step in which the rear flap is folded around the first folding line through a first folding hand which rotates about a first folding axis transversal to the longitudinal direction and in which the front flap is folded through a second folding hand which rotates about a second folding axis transversal to the longitudinal direction. Alternatively, there is a step in which the front flap is folded through the second folding hand first, and then the rear flap is folded through the first folding hand so that the tab of the front flap and the rear flap overlap. The method also comprises a step of adjusting the reciprocal position of the first and the second folding axis, responsive to the input data.

The method may also comprise the following steps:

detecting the blank on the working plane;

stopping the movement of the blank responsive to the detecting step, so that the blank is arranged in a folding position wherein the first folding line and the second folding line of the blank are placed in a predetermined position with respect to the first folding axis and the second folding axis, respectively.

In an example, the method comprises a step in which, during the step of folding, a pushing action is provided underneath the rear flap and the front flap of the blank in proximity to the first folding axis and the second folding axis, respectively, to lift the rear flap and the front flap of the blank from the working plane. In this case, the central portion of the blank is held down to prevent lifting thereof from the working plane.

The method may comprise a step of separating the blank from the cardboard sheet, where the step of applying the strip of glue is simultaneous with the step of separating the blank from the cardboard sheet.

These and other features will become more apparent from the following description of a preferred embodiment, illustrated purely by way of non-limiting example in the accompanying drawings, in which.

Figure 1:
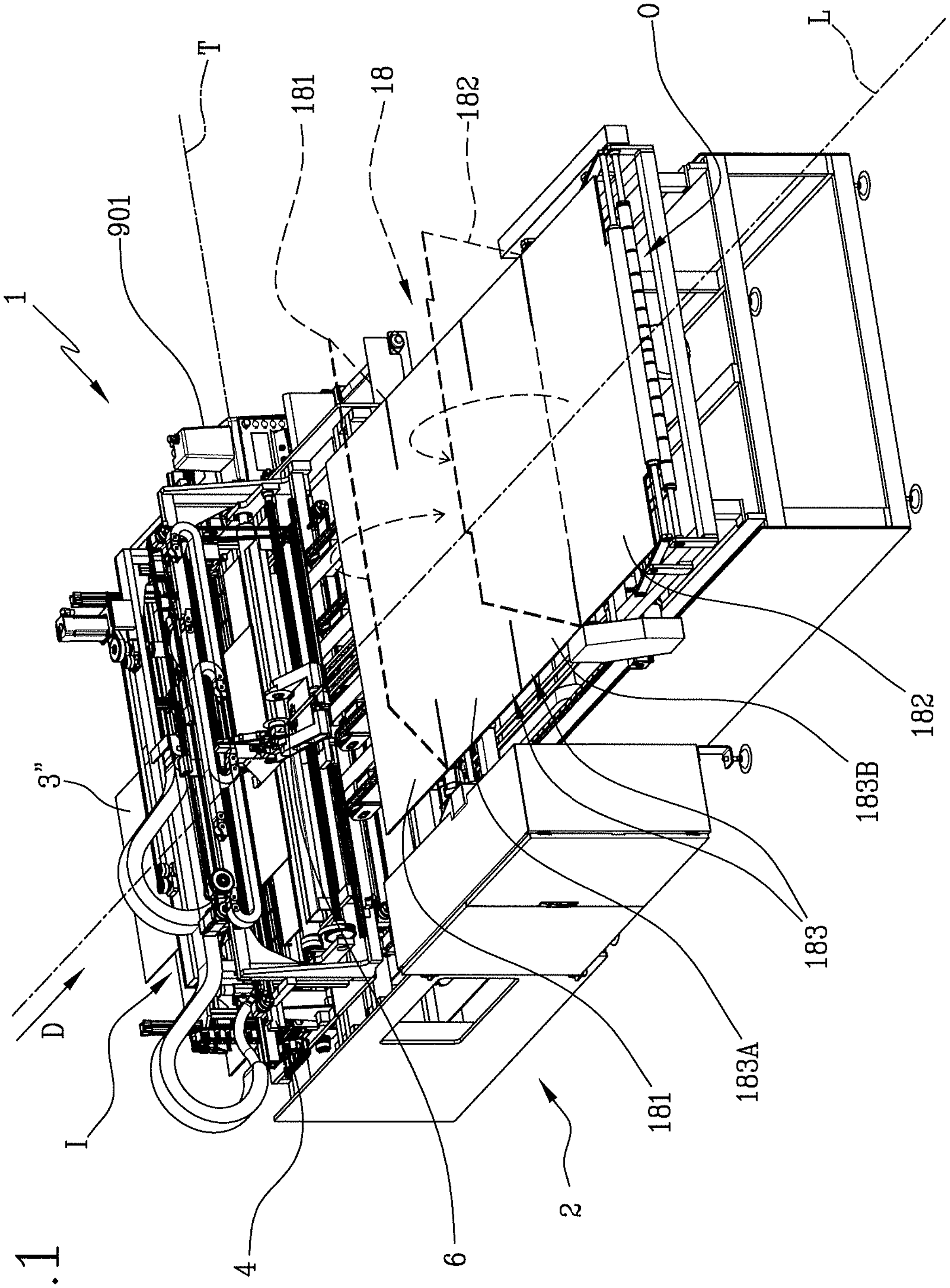
FIG. 1 illustrates an apparatus according to this disclosure.
Figure 2:
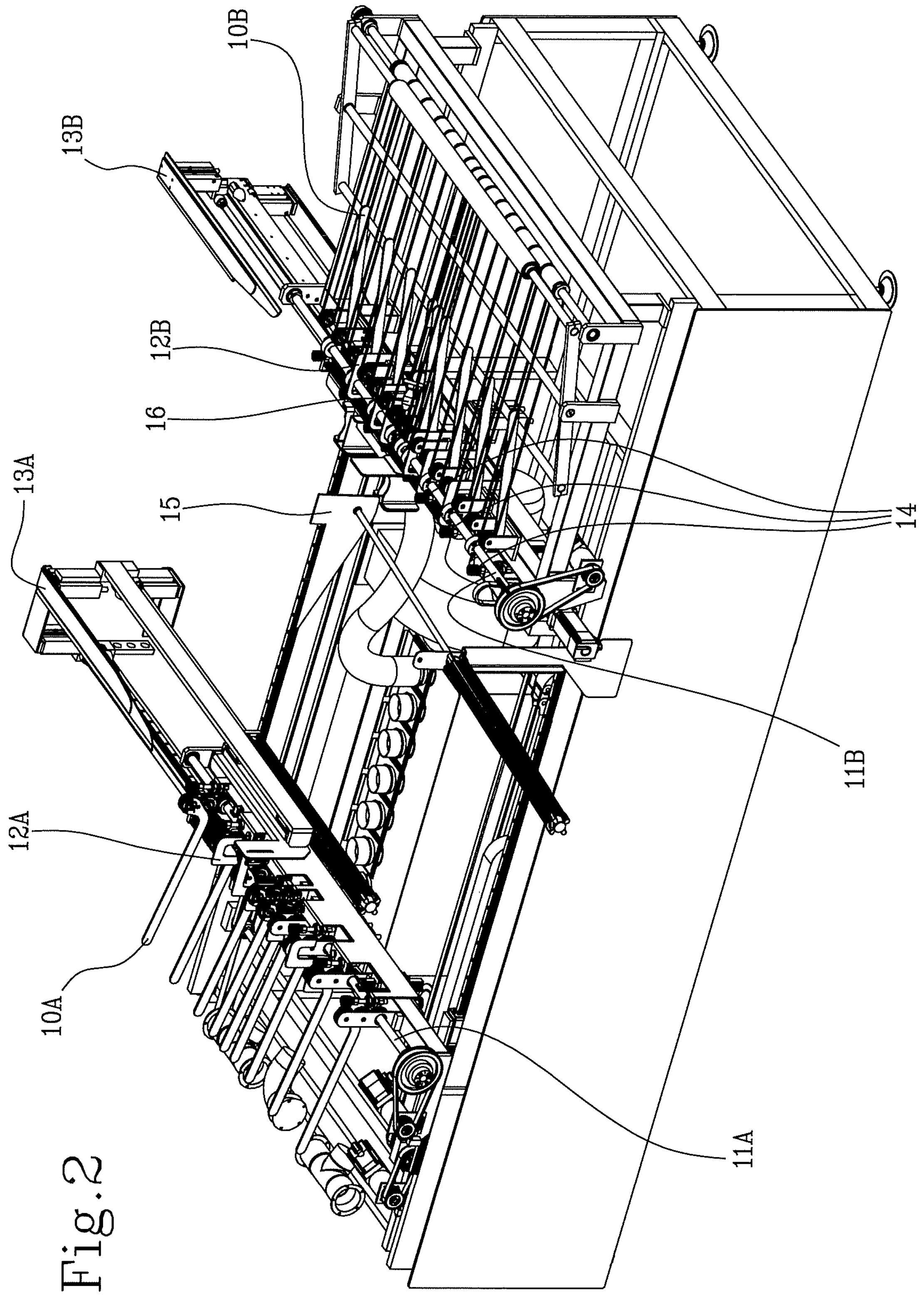
FIG. 2 illustrates the folding unit of the apparatus of FIG. 1.
Figure 3:
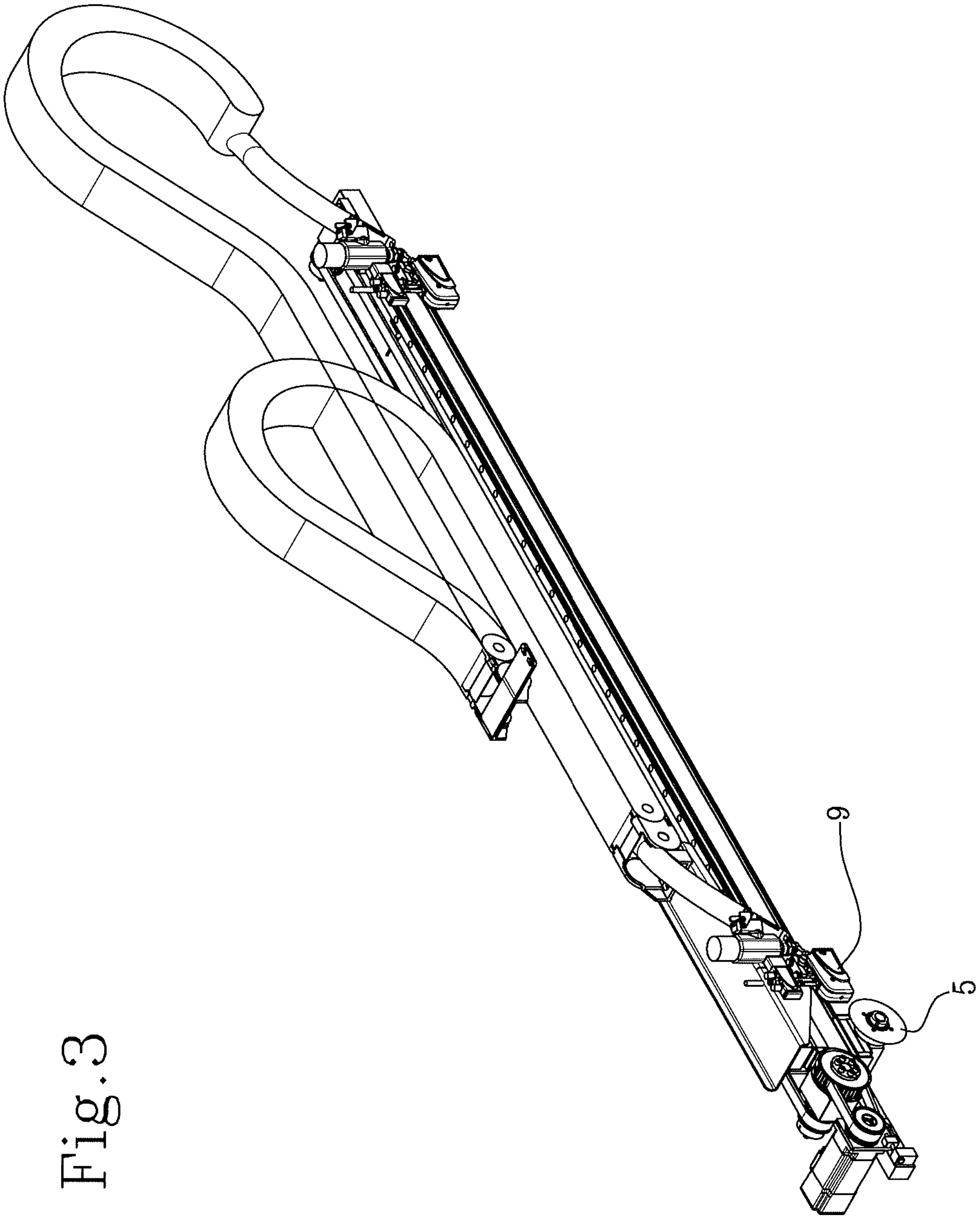
FIG. 3 illustrates a part of the apparatus of FIG. 1.

With reference to the accompanying drawings, the numeral 1 denotes an apparatus for continuous production of pre-folded blanks 18 of corrugated cardboard, where each blank can be tailored for a respective item to be packed.

The apparatus 1 comprises a frame 2. The frame 2 is configured to support a cardboard sheet 3 in a working plane. In an example, the working plane is parallel to the ground.

Figure 4A:
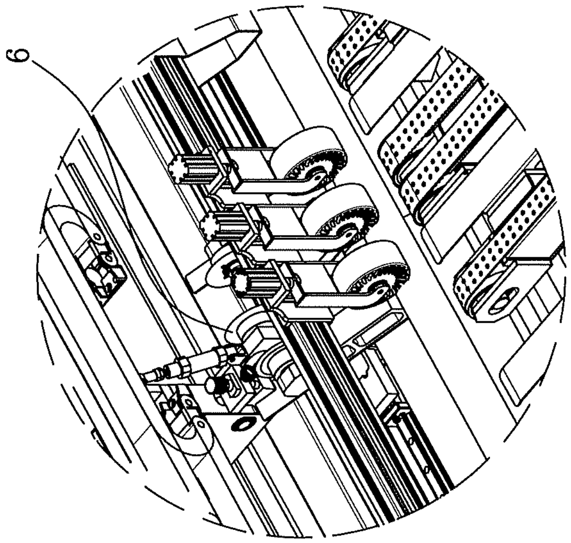
FIG. 4A shows an enlarged detail from FIG. 4.
Figure 4:
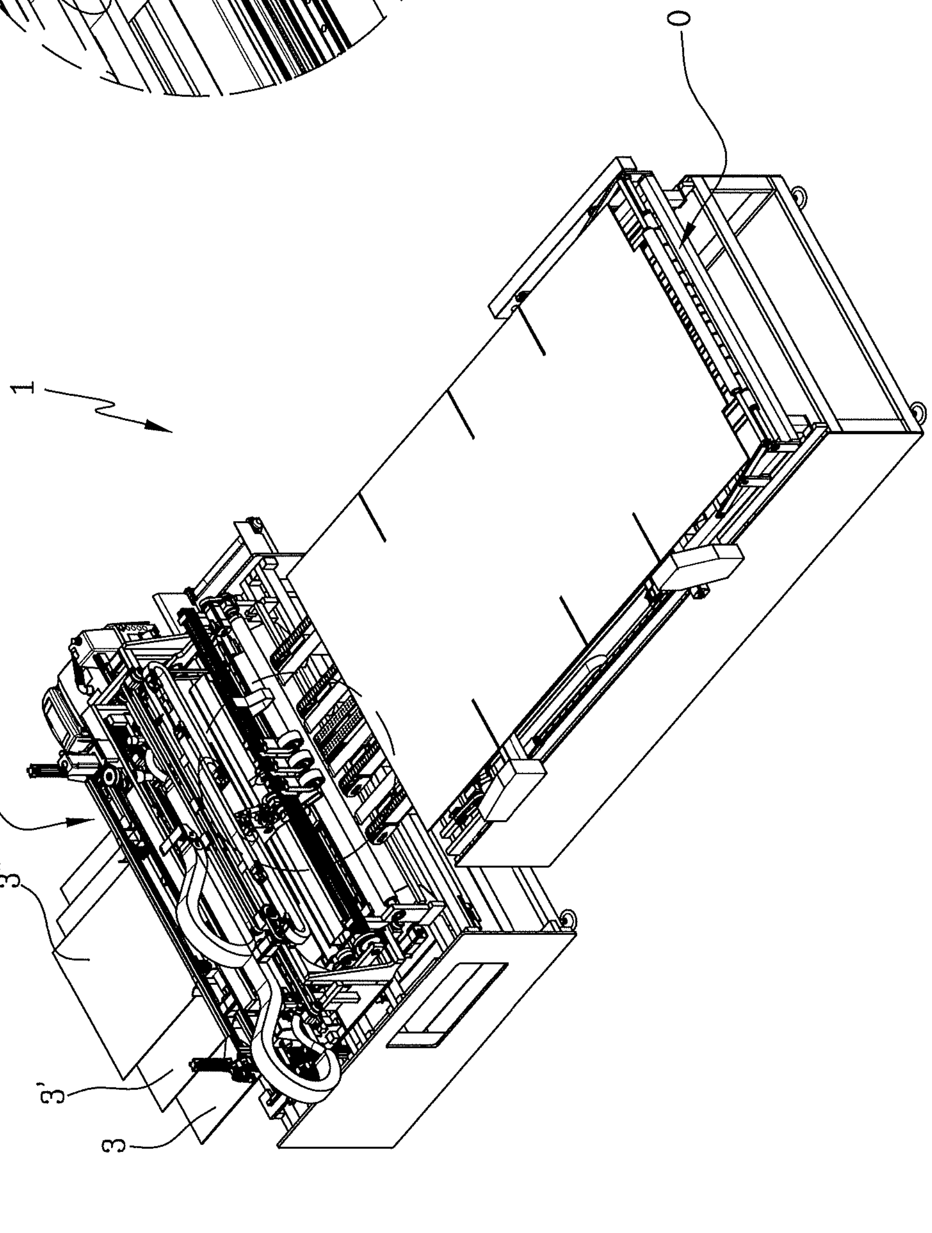
FIG. 4 illustrates the apparatus of FIG. 1 in a perspective view from a different angle.
Figure 5:
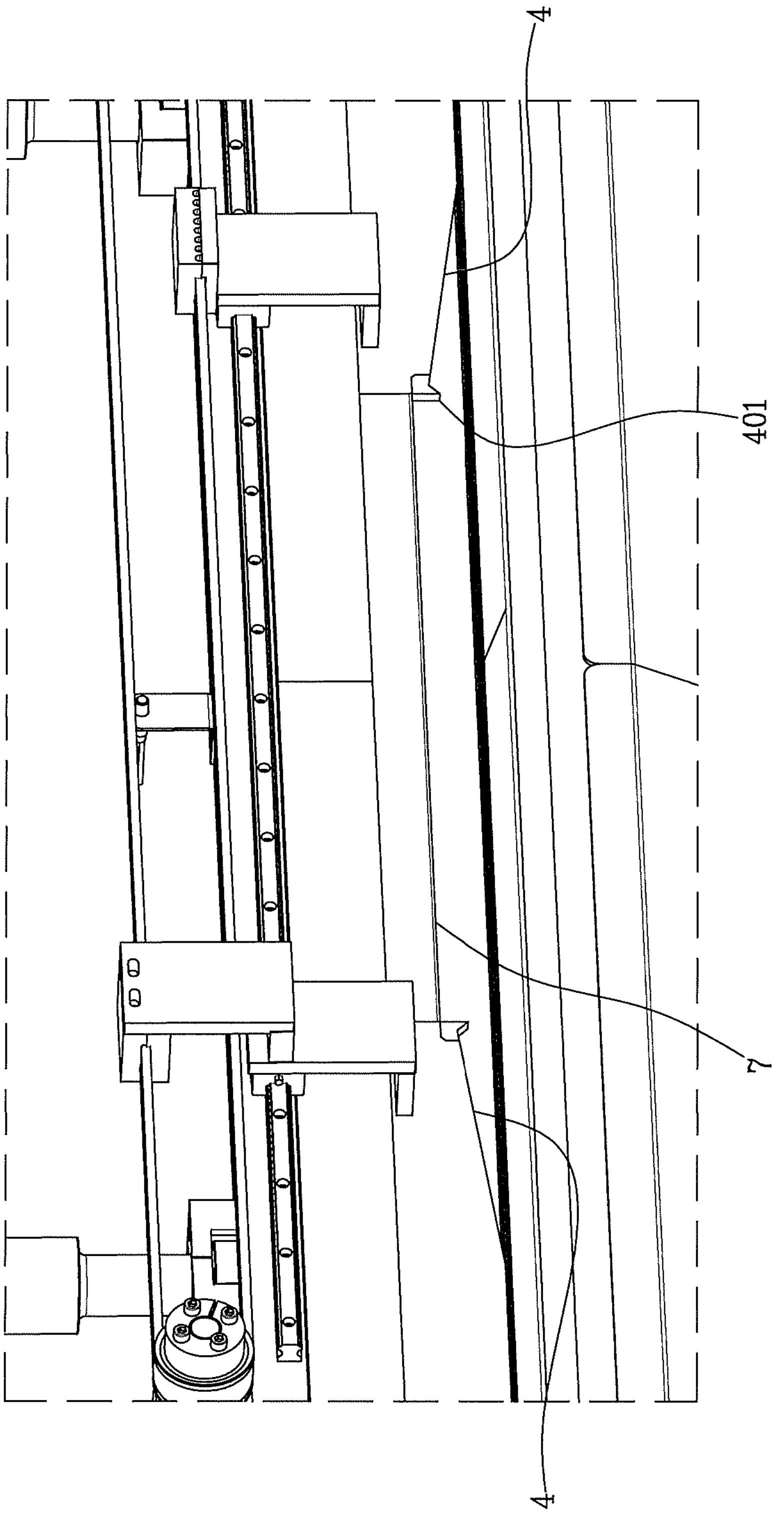
FIG. 5 illustrates another part of the apparatus of FIG. 1.
Figure 6:
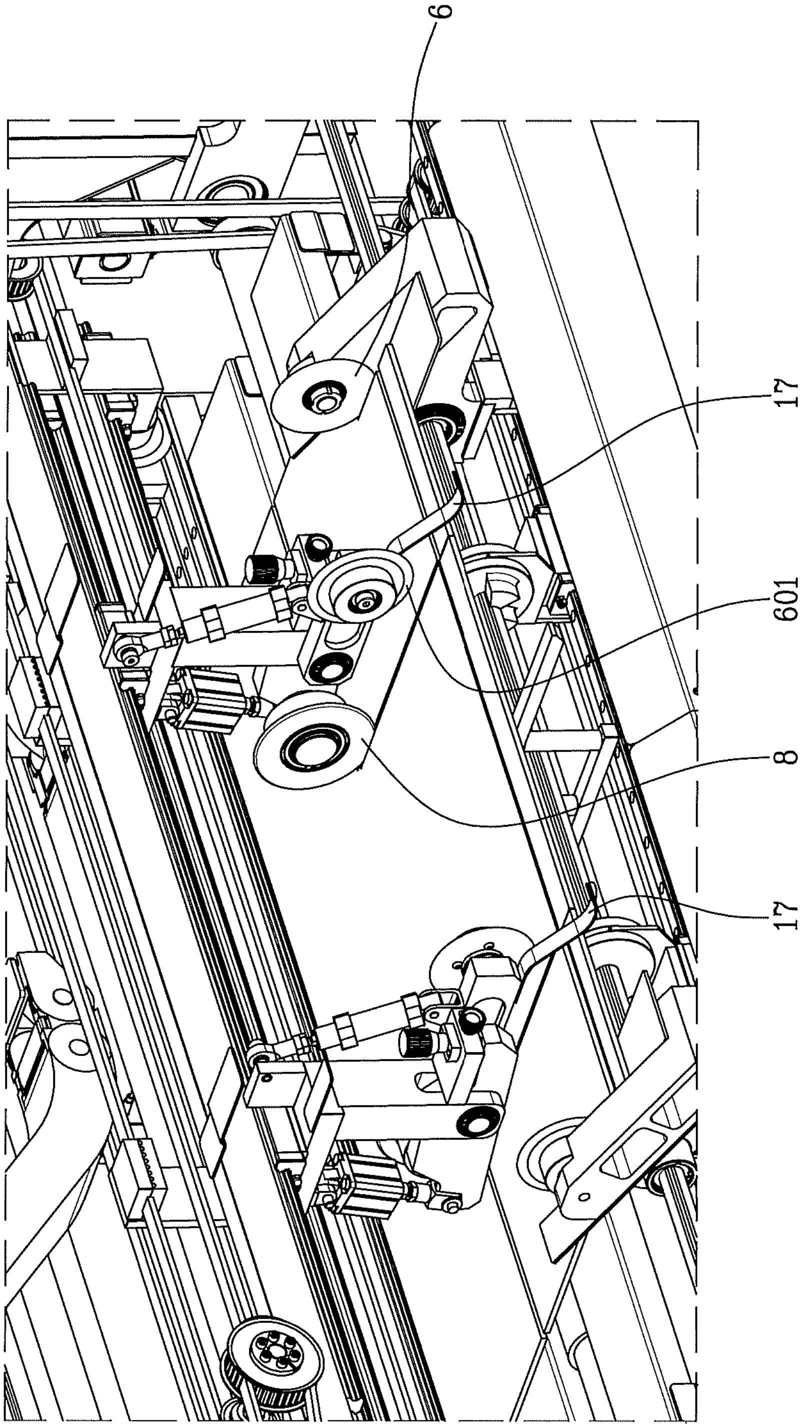
FIG. 6 illustrates another part of the apparatus of FIG. 1.
Figure 7A:
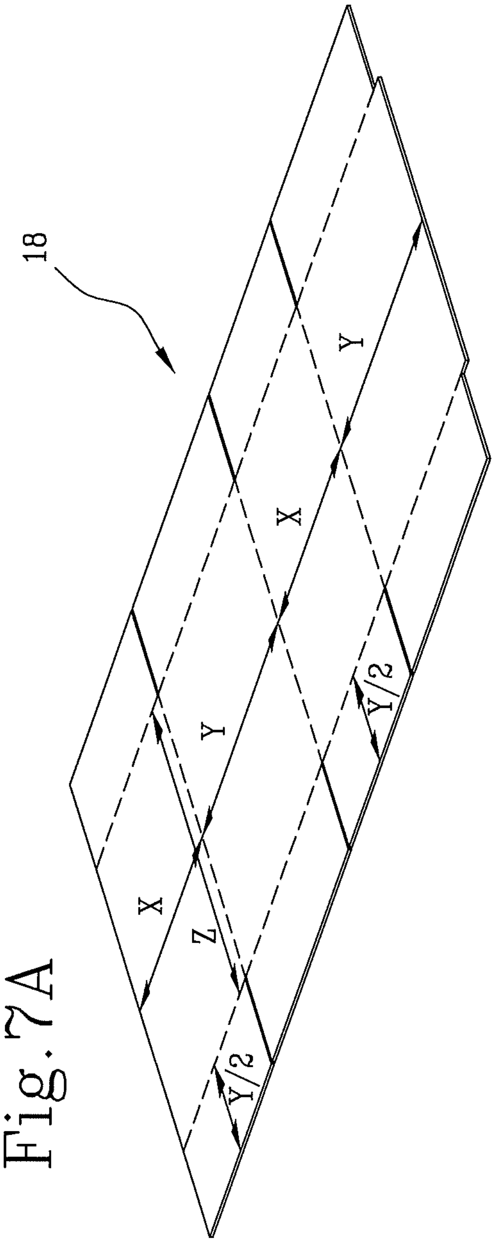
FIG. 7A illustrates a cardboard blank after cutting and creasing.
Figure 7B:
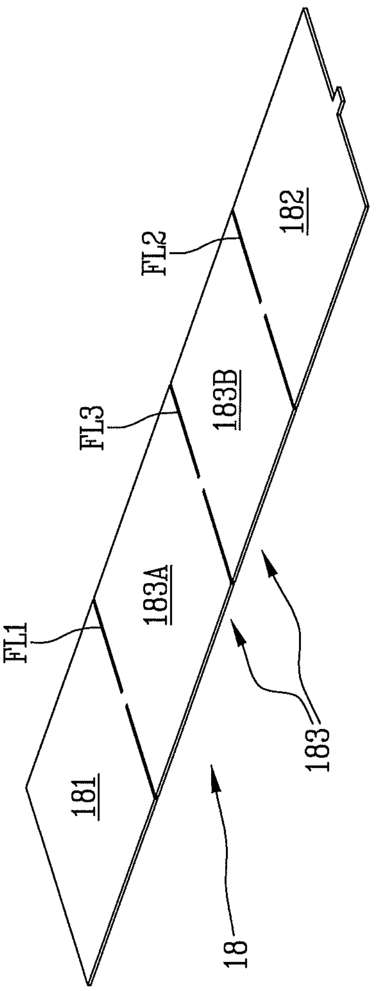
FIG. 7B illustrates the front flap, the rear flap and the central portion of the blank after cutting and creasing.
Figure 7C:
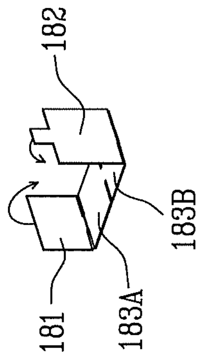
FIG. 7C illustrates the front and rear flaps folded through the folding unit.
Figure 7D:
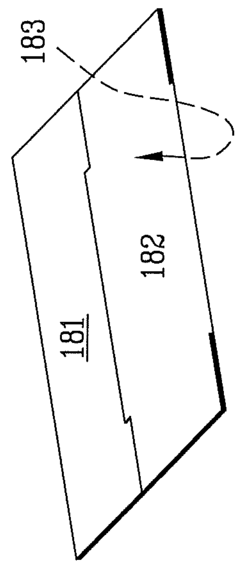
FIG. 7D illustrates the pre-folded blank released at the outlet of the apparatus of FIG. 1, with the front and rear flaps folded onto the central portion and at least a tab of the front flap overlapping at least part of the rear flap.

The apparatus 1 comprises a feeding unit. The feeding unit is configured to receive the corrugated cardboard sheet 3 from a cardboard reservoir, at a loading section I. The cardboard reservoir is configured to store the cardboard sheet 3 that is processed at a later stage. The reservoir may be of the fanfold type (a continuous sheet of corrugated cardboard where portions of the sheet are folded on top of one another). Alternatively, the cardboard reservoir may be a roll where the sheet of cardboard is wound substantially spirally. In an example, the cardboard reservoir comprises a plurality of supporting planes parallel to each other and parallel to the ground. The supporting planes (as illustrated for example in FIG. 4) contain cardboard sheets with three of more different widths, namely, minimum width 3'', medium width 3' and maximum width 3. The feeding unit is also configured to move the cardboard sheet 3 forward in a longitudinal direction L, advancing it on the working plane in an advancing direction.

The term "advancing direction" refers to the movement performed by the cardboard 3 in the apparatus 1. First, an end portion of the cardboard sheet 3 contained in the reservoir is pulled (into the loading section) and advanced by the feeding unit towards the zone of the apparatus 1 where that portion of the sheet is processed to form the blank 18. To move the sheet 3 into the loading station, the feeding unit comprises conveyor rollers, for example. The conveyor rollers are coupled to the frame 2. In an example, the feeding unit comprises a pair of conveyor rollers, one of which is idle and the other power driven. In this case, both of the rollers are stationary with respect to the frame 2 and the cardboard sheet 3 is interposed between them. The conveyor rollers are configured to rotate and to advance the cardboard sheet 3 in a longitudinal direction L.

The blank 18 is then separated from the rest of the sheet 3; next, it is advanced into another zone of the apparatus 1, where the blank 18 is folded (that is, pre-folded) and its ends fastened together by the strip of glue.

In an example, the feeding unit comprises, for example, a suction belt 14 to move the blank 18 in the advancing direction.

In an embodiment, the apparatus 1 comprises a conveyor for conveying the items to be packed. The apparatus 1 may comprise a sensor unit. For example, the sensor unit includes one or more sensors or a vision system. The sensor unit is preferably connected to the conveyor and is configured for detecting size information representative of the size of each item on the conveyor. The size information may include a length and a width and a height of the item to be packed.

The apparatus 1 comprises a control unit. The control unit can be connected to the sensor unit and is configured to receive input data responsive to the size information. The control unit is also configured to process the input data to derive a setting for the apparatus 1. The setting of the apparatus may be a length Z and a width Y and a height X of the cardboard blank 18.

The apparatus 1 comprises a plurality of cutters coupled to the frame 2.

The cutters of the plurality of cutters have the function of making cuts on the cardboard sheet to obtain the blank 18.

The apparatus 1 also comprises a plurality of creasers. The plurality of creasers is coupled to the frame 2 and is movable at least in a transversal direction T and a longitudinal direction L. The plurality of creasers is configured to move in relation to the cardboard, based on the apparatus setting, to generate a plurality of folding lines on the blank 18. The plurality of creasers may include a transversal creaser 7 and a pair of longitudinal creasers 8. Each creaser of the plurality of creasers is movable between a plurality of working positions at different distances from the working plane so that the distance of the creaser from the working plane can or cannot be adjusted based on the thickness of the cardboard. For example, in the case of thick cardboards, the distance between the working plane and the creasers can be varied and increases.

The apparatus 1 also comprises a plurality of actuators. The plurality of actuators are connected to the cutters and to the creasers. The actuators are connected to the control unit and have the function of moving the cutters and the creasers in such a way that the cutters and creasers are positioned on the cardboard sheet 3 relative to the frame 2 according to the setting of the apparatus.

The cutters and creasers are configured to move (for example, transversally) relative to the frame 2, based on the setting of the apparatus, so as to make a plurality of cuts and folding lines on the cardboard sheet 3 such that the blank 18 formed has the required size. The control unit causes one or more of the cutters and creasers to move to positions derived in response to the input data provided by the sensor unit; therefore, the control unit, based on the input data, determines and updates the apparatus setting (substantially in real time).

One or more of the cutters of the plurality of cutters are movable transversally to make transversal cuts.

In an example, the plurality of cutters may include a cutting device for cutting strips of cardboard out of the cardboard sheet (this operation is also known as slitting). The cuts made by this cutting device determine the height X of the box that will subsequently be made from the blank 18. The cutting device includes a pair of blades 4. In an example, the transversal creaser 7 is interposed between the pair of blades 4. The pair of blades 4 is preferably movable orthogonally to the working plane from a raised position to a lowered position. The two blades 4 move transversally so that they can be positioned on the cardboard sheet 3 according to the apparatus setting derived by the control unit.

The cutting device also includes a receiving member. The receiving member has a pair of abutment surfaces and a slit interposed between the abutment surfaces. The slit is adapted to receive the blades 4 in the lowered position, where the abutment surfaces are operatively in contact with cardboard portions arranged laterally to the strip of cardboard 3 to be removed, and where the cardboard is operatively interposed between the pair of blades 4 and the receiving member. The blades 4 are parallel to and spaced from each other and include a tooth 401 whose function is to separate the cardboard sheet.

In an embodiment, the apparatus 1 two identical cutting devices, one of which is movable longitudinally according to the setting of the apparatus 1. This solution allows the cardboard sheet 3 to be stopped only twice for the transversal cuts and folding lines to be made on it.

Inside the apparatus, the cardboard 3 is moved intermittently, advancing and stopping alternately. The sheet 3 is stopped by the feeding unit and, during the time it is not moving, the cutting device moves downwards orthogonally to the working plane to make the transversal cuts (or slits) on the sheet 3.

The apparatus 1 comprises a pair of longitudinal cutters 6. To make the longitudinal cuts, the apparatus produces a relative longitudinal movement between the cardboard 3 and one or more of the cutters; in an example, during longitudinal cutting, the longitudinal cutters 6 remain stationary while the cardboard advances longitudinally; alternatively, one or more of the longitudinal cutters 6 might perform the longitudinal movement.

The plurality of cutters may also include a separating cutter 5. Preferably, the separating cutter 5 is a cutting disc movable transversally with respect to the longitudinal direction L. The separating cutter 5 is configured to separate the blank from the remaining, excess portion of the cardboard sheet 3.

In an example, the blank 18 is cut in such a way as to provide it with a rear flap 181 and a front flap 182. The rear flap and the front flap are spaced along a longitudinal axis of the blank. Further, a central portion 183 of the blank 18 is separated from the rear flap 181 and from the front flap 182 by a first and a second folding line FL1, FL2, respectively. The first and second folding lines are oriented transversally with respect to the longitudinal axis of the blank.

The central portion 183 of the blank 18 also includes a first flap 183A and a second flap 183B. The first flap 183A and the second flap 183B are separated from each other by a third folding line FL3. The third folding line FL3 is parallel to the first and second folding lines.

The apparatus may comprise a tongue 17. The tongue 17 is coupled to the frame 2 and is elastically deformable to interact with the cardboard sheet 3 advanced on the working plane, to push down the cardboard offcuts produced by trimming cutters 601.

The apparatus comprises a glue applicator 9 configured to apply a strip of glue on a portion of the blank, for example, on a portion of the rear flap. The glue applicator may be a glue gun connected to a hot-melt glue tank 901.

In an example, the glue applicator 9 applies the strip of glue on the blank at the same time as the separating cutter 5 cuts the blank.

After cutting and creasing, the blank comprises a plurality of transversal and longitudinal folding lines which separate the front flap and its tab, the rear flap and the two flaps of the central portion of the blank. The width X of the rear flap determines the height of the box that will subsequently be made from the blank. The value of X is calculated in response to the height of the item to be packed. The width Y of the front flap of the blank is calculated in response to the width of the item to be packed and determines the width of the box that will subsequently be made from the blank. The distance Z between the longitudinal folding lines determines the length of the box. Lateral flaps of the blank 18 have a length value that is Y/2.

The apparatus comprises a folding unit configured to receive the blank and to fold it. The folding unit comprises a first folding hand 10A and a second folding hand 10B configured to fold the rear flap and the front flap and the related tab, respectively, in such a way that the tab of the front flap is attached to the rear flap by the strip of glue. More specifically, the folding unit is configured to fold the rear flap 181 and the front flap 182 of the blank 18, respectively, onto the central portion 183 of the blank so that the rear flap and the front flap are folded onto the central portion and the central portion 183 is held down on the working plane and the tab of the front flap 182 is attached to the rear flap by the strip of glue. In other words, the first folding hand and the second folding hand are configured to fold the rear flap 181 and the front flap 182 of the blank, respectively, onto the central portion 183 so that, in the pre-folded blank, the front flap and the rear flap overlap the central portion and are in contact therewith. The pre-folded blank has a flat shape. In an example, the first folding hand 10A is positioned upstream of the second folding hand 10B relative to the advancing direction D of the cardboard. The first folding hand 10A and the second folding hand 10B preferably rotate about a first folding axis 11A and a second folding axis 11B, respectively. The folding axes are oriented transversally to the longitudinal direction L. Further, the first folding hand 10A and the second folding hand 10B are configured to fold the rear flap 181 and the front flap 182 from a first position, where the front flap and the rear flap are positioned on the working plane, to a second positon, where the front flap and the rear flap overlap the central portion 183. The central portion is disposed on the working plane in the first and the second position. In other words, the folding hands are configured to fold the rear flap 181 and the front flap 182 onto the first flap 183A and the second flap 183B of the central portion 183 of the blank 18 so as to obtain a flat, pre-folded blank.

In an example, the first folding hand 10A and the second folding hand 10B are reciprocally movable, to vary the distance between the first folding axis 11A and the second folding axis 11B along the longitudinal direction L. Preferably, the first folding axis 11A is movable with respect to the frame 2 to translate longitudinally and the second folding axis 11B is stationary with respect to the frame 2.

The apparatus 1 may comprise a sensor unit, configured to detect positioning information. The positioning information may be responsive to a position of the front flap of the blank with respect to the frame 2. The sensor unit may be, for example, a sensor that is connected to the control unit. In this case, the control unit is programmed to send a command signal to the feeding unit to stop the blank in a folding position, responsive to the positioning information, so that the first folding line and the second folding line of the blank are placed in a predetermined position with respect to the first folding axis 11A and the second folding axis 11B, respectively.

The apparatus 1 also comprises a distance actuator for varying the distance between the first folding axis 11A and the second folding axis 11B. The control unit is connected to the distance actuator and is programmed to derive an operating distance, based on the input data. The distance actuator is configured to move the first folding hand 10A with respect to the second folding hand 10B so that the first folding hand 11A and the second folding axis 11B are positioned at the operating distance from each other.

Depending on the type of cardboard used (for example, if the cardboard reservoir is of the fanfold type), the cardboard might have folding lines in addition to those made by the creasers. In this case, the folding hands might fold the flaps of the blank 18 about the wrong folding lines. The folding unit may comprise a first pusher 12A and a second pusher 12B. The first pusher is located upstream of the first folding axis 11A and the second pusher 12B is located downstream of the second folding axis 11B. The first pusher 12A is configured to cooperate with the first folding hand 10A to lift the rear flap of the blank, which is positioned in the folding position. The second pusher 12B is configured to cooperate with the second folding hand 10B to lift the front flap of the blank, which is positioned in the folding position. The folding unit also comprises a finger, coupled to the frame 2. The finger has the function of holding the front flap of the blank to prevent the front flap from unfolding when the second folding hand 10B is spaced apart from the front flap.

The apparatus may also comprise a first holder 13A and a second holder 13B. The first holder 13A is located downstream of the first folding axis 11A and the second holder 13B is located upstream of the second folding axis 11B. The holders cooperate with the first and the second folding hands to prevent the central portion of the blank from being lifted away from the working plane.

In an example, the apparatus 1 comprises a spreading-out element 15. The spreading-out element is movable transversally and is configured to push the front flap of the blank downwards, should it be in a folded position. The spreading-out element is configured to ensure that the front flap of the blank 18 is spread out on the working plane so that the sensor can detect the position of the flap with respect to the frame.

The apparatus 1 also includes an outlet O to release the pre-folded blanks. The apparatus 1 thus includes a loading section I and an outfeed station (or outlet) O. The loading section I receives the corrugated cardboard sheet 3 from a cardboard reservoir and the outlet O of the apparatus 1 releases the pre-folded blanks made one after the other. The blank 18 released through the outlet O is a flat blank in which the rear flap and the front flap of the blank are folded onto the central portion of the blank in such a way that the rear flap and the front flap are in contact with the central portion and the tab of the front flap is attached to the rear flap by the strip of glue.

The apparatus 1 may also comprise a plurality of rollers at the outlet of the apparatus. The rollers are located at an unloading section downstream of the second folding hand 10B and are configured to press down on the pre-folded blank 18 so that the glue strip sets and prevents the flap from opening.

According to an aspect of it, this disclosure also provides a method for processing a corrugated cardboard sheet to produce pre-folded, glued blanks, where each blank 18 can be tailored for a respective item to be packed.

The method comprises a step of capturing input data representative of the size of the item to be packed. More specifically, the control data may include a length and a width and a height of the item to be packed. Preferably, the input data are captured automatically, for example, through at least one sensor which detects the size of the items to be packed. The items to be packed may be transported on a conveyor. Alternatively, the step of capturing the data may be a step of capturing the data manually in which an operator obtains the input data and enters them manually in a control unit.

The method also comprises a step of processing the input data. In the step of processing, the control unit processes the input data and derives a setting for the apparatus 1 based on the input data. The setting of the apparatus may be, for example, a value of length and a value of width for the blank 18.

The method comprises a step of feeding. The step of feeding comprises a step of loading into a loading section I a sheet of cardboard 3 from a reservoir. The method also comprises a step of moving the cardboard sheet on a working plane in an advancing direction oriented longitudinally by means of a plurality of conveyor rollers.

The method comprises a step of providing a plurality of cutters and a plurality of creasers.

The method comprises a step of positioning the cutters and the creasers with respect to the frame 2, responsive to the input data.

The method comprises a step of cutting the cardboard sheet 3 in order to form the blank. The step of cutting includes a step of activating the cutters on the cardboard sheet 3 and making a plurality transversal and longitudinal cuts.

The method comprises a step of activating the creasers on the cardboard sheet 3 to make a corresponding plurality of folding lines on the blank 18. The step of creasing includes a step of making a plurality of transversal folding lines and a plurality of longitudinal folding lines.

In a possible example embodiment, each) creaser of the plurality of creasers is movable and adjustable, based on the thickness of the cardboard sheet 3, between a plurality of working positions at different distances from the working plane so as to adjust the distance of the creaser from the working plane.

The method comprises a step of separating the blank from the remaining portion of the cardboard sheet 3 by means of a separating cutter 5 (forming part of the plurality of cutters).

In an example, a strip of glue is applied on a portion of the blank at the same time as the blank is separated from the rest of the cardboard sheet. This solution may be advantageous because it allows making the process faster and the apparatus less cumbersome.

Alternatively, the strip of glue might be applied on the cardboard sheet 3 at a different stage, distinct from the step of separating the blank.

The method comprises a step of cutting a front end of the blank. As the blank 18 leaves the cutting and creasing zone, one of the cutters of the plurality of cutters makes longitudinal cuts at the front end of the blank 18 to separate pieces of cardboard from it. This step does not involve stopping the blank on the working plane.

The method comprises a step of transporting the blank on the working plane in the advancing direction, by means, for example, of a suction belt 14 or other conveying system.

The blank is cut in such a way as to provide it with a rear flap 181 and a front flap 182. The rear flap and the front flap are spaced along a longitudinal axis of the blank. Further, a central portion 183, made up of two flaps, is separated from the rear flap and the front flap by a first and a second folding line FL1, FL2, respectively. The first and second folding lines are oriented transversally with respect to the longitudinal axis of the blank. The central portion 183 of the blank 18 also includes a first flap 183A and a second flap 183B. The first flap 183A and the second flap 183B are separated from each other by a third folding line FL3. The third folding line FL3 is parallel to the first and second folding lines.

The method comprises a step of folding the blank. The flaps of the blank 18 are folded by a first folding hand 10A and a second folding hand 10B. In a preferred embodiment, the first folding hand 10A rotates about a first folding axis 11A, transversal to the longitudinal direction L, and the second folding hand 10B rotates around a second folding axis 11B, transversal to the longitudinal direction L. Further, the first folding hand 10A and the second folding hand 10B fold the rear flap 181 and the front flap 182 from a first position, where the front flap and the rear flap are positioned on the working plane, to a second positon, where the front flap and the rear flap overlap the central portion 183. The central portion is disposed on the working plane in the first and the second position. In other words, the folding hands fold the rear flap 181 and the front flap 182 onto the central portion 183 of the blank 18 so as to obtain a flat, pre-folded blank. Preferably, the first folding hand 10A is positioned upstream of the second folding hand 10B relative to the advancing direction of the cardboard.

In the step of folding, the rear flap is folded about the first folding line through the first folding hand 10A and the front flap is folded about the second folding line through the second folding hand 10B. Alternatively, there is a step in which the front flap is folded through the second folding hand 10B first, and then the rear flap is folded through the first folding hand 10A.

In an example, the flaps of the blank are folded in such a way that the rear flap and the tab of the front flap overlap the central portion and are attached to each other by the strip of glue.

The method may comprise a step of detecting the position of the blank, through a sensor, for example. In this case, the sensor sends position information representing the position of the blank relative to the frame 2 and the control unit stops the blank at a folding position. The folding position is calculated on the basis of the data received in the step of detecting. The folding position is calculated so that the blank is placed in a folding position where the first folding line and the second folding line of the blank are placed in a predetermined position with respect to the first folding axis and the second folding axis, respectively.

The method may also comprise a step of spreading out the front flap of the blank. In this case, a spreading-out element 15 is movable transversally. The spreading-out element 15 pushes the front flap of the blank downwards to keep it spread out flat on the working plane so that the sensor detects the position of the flap relative to the frame 2 in the step of detecting.

The method may comprise a step of adjusting a reciprocal position between the first and the second folding axis, responsive to the input data. In a preferred embodiment, the folding hand 10A is moved according to the data received in the step of detecting, while the second folding hand 10B is stationary. In this case, the control unit sends to the distance actuator a control signal, derived from the blank positioning information, so as to move the first folding hand 10A in such a way that the first folding axis 11A is positioned in proximity to the first folding line of the blank.

The sensor detects the position of the front flap of the blank. Knowing the position of the second folding axis 11B (the axis that is stationary with respect to the frame), the speed at which the blank is moved on the working plane and the size of the blank (based on the input data), the control unit can determine the position where the feeding unit must stop the blank 18 so the second folding line is positioned in proximity to the second folding axis.

Moreover, having the size of the blank, the control unit can generate a command signal for the distance actuator. The distance actuator is configured to move the first folding axis, based on the size of the blank, so as to position the first folding line in proximity to the first folding line 11A.

In an example, the method comprises a step of pre-lifting the rear flap and the front flap of the blank. The rear flap and the front flap of the blank are lifted from the working plane in proximity to the first and the second folding axis by a first pusher 12A and a second pusher 12B. This solution prevents the flaps from being folded about the wrong folding lines.

The method may also comprise a step of holding the central portion f the blank so as to prevent it from being lifted from the working plane.

The blank can then be transported towards an unloading section at the outlet O of the apparatus 1, where a plurality of rollers press the blank to hold the flaps down and give the glue time to set. Thus, the corrugated cardboard sheet 3 is received by the loading section I from a cardboard reservoir and the pre-folded blanks made one after the other are released at the outlet O of the apparatus 1.

The invention claimed is:

1. An apparatus for continuous production of pre-folded blanks of corrugated cardboard, wherein each blank is tailorable for a respective item to be packed, comprising:

a feeding unit, configured to receive, at a loading section, a corrugated cardboard sheet from a cardboard reservoir and configured to move the cardboard sheet forward in a longitudinal direction;

a frame, configured for supporting the cardboard sheet in a working plane parallel to the ground;

a control unit, adapted to receive input data representative of a size of the item to be packed and programmed to derive an apparatus setting for the apparatus, responsive to the input data;

a plurality of cutters, movably coupled to the frame and configured to cut the cardboard sheet into a desired blank, the blank having a front end and a rear end spaced along a longitudinal axis of the blank;

a plurality of creasers, movably coupled to the frame and configured to generate crease lines in the cardboard sheet, to generate a plurality of folding lines in the blank, the plurality of folding lines including a first and a second folding line, oriented transversally to the longitudinal axis of the blank;

a plurality of actuators, connected to the cutters and to the creasers and connected to the control unit, for positioning the cutters and the creasers with respect to the frame, responsive to the apparatus setting;

a glue applicator configured to apply a strip of glue on a portion of the blank;

a folding unit, including a first folding hand and a second folding hand, the first folding hand being located upstream of the second folding hand with respect to an advancing direction of the blank, wherein the first and the second folding hands are configured for folding a rear flap and a front flap of the blank, respectively, onto a central portion of the blank, so that the tab of the front flap is attached to the rear flap by the glue strip.

2. The apparatus according to claim 1, wherein the first folding hand and the second folding hand are configured to fold the rear flap and the front flap of the blank, respectively, onto the central portion of the blank in contact therewith, so that, in the pre-folded blank, a tab of the front flap and a part of the rear flap are overlapped, and the front flap and the rear flap are in contact with the central portion of the blank to form the pre-folded blank, the pre-folded blank being flat, wherein the apparatus further comprises an outlet, to release the pre-folded blanks.

3. The apparatus according to claim 1, wherein the first folding hand is rotatable to rotate around a first folding axis, oriented transversally with respect to the longitudinal direction, and the second folding hand is rotatable to rotate around a second folding axis, oriented transversally with respect to the longitudinal direction.

4. The apparatus according to claim 3, wherein the first and the second folding hands are reciprocally movable, to vary, along the longitudinal direction, a distance between the first and the second folding axis.

5. The apparatus according to claim 4, and further comprising a distance actuator for varying the distance between the first and the second folding axis, wherein the control unit is connected to the distance actuator and is programmed to derive an operating distance based on the input data and to command the distance actuator to move the first and the second folding hands so that their reciprocal distance is the operating distance.

6. The apparatus according to claim 5, and further comprising a sensor, configured to detect positioning information responsive to a position of the blank with respect to the frame, wherein the control unit is programmed to command the feeding unit to position and stop the blank in a folding position, responsive to the positioning information, so that the first folding line and the second folding line of the blank are placed in a predetermined position with respect to the first and the second folding axis, respectively.

7. The apparatus according to claim 6, wherein the first folding axis is movable with respect to the frame to translate longitudinally and the second folding axis is stationary with respect to the frame, or vice versa.

8. The apparatus according to claim 3, and further comprising:

a first pusher, cooperating with the first folding hand and located upstream of the first folding axis to lift the rear flap of the blank positioned in a folding position;

a second pusher, cooperating with the second folding hand and located downstream of the second folding axis to lift the front flap of the blank positioned in a folding position.

9. The apparatus according to claim 3, and further comprising one or more holders, cooperating with the first and the second folding hands and located between the first folding axis and the second folding axis, to prevent the central portion of the blank from lifting with respect to the working plane.

10. The apparatus according to claim 1, wherein the plurality of cutters includes a separating cutter, movable transversally to the longitudinal direction for separating the blank from the cardboard sheet, and wherein the glue applicator is configured to apply the strip of glue simultaneously with the transversal movement of the separating cutter.

11. The apparatus according to claim 1, wherein at least one creaser of the plurality of creasers is positionable in a plurality of working positions in which the creaser is lowered to a predetermined height to penetrate the cardboard to a creasing depth, wherein said working positions have different distances with respect to the working plane, so that the height of the creaser in the working position is adjustable.

12. The apparatus according to claim 11, and further comprising an actuator connected to the creaser, to place the creaser in the working position, wherein the control unit is programmed to command the actuator to automatically move the creaser to a position derived in response to data received from the control unit relating to a thickness of the cardboard.

13. The apparatus according to claim 1, and further comprising a finger configured for holding the front flap of the blank, to prevent unfolding of the front flap when the second folding hand is spaced apart from the front flap.

14. The apparatus according to claim 1, and further comprising a tongue, coupled to the frame and elastically deformable to interact with the cardboard sheet advanced on the working plane, to push down cardboard offcuts produced by one or more cutters of the plurality of cutters.

15. The apparatus according to claim 1, wherein the plurality of cutters includes a cutting device for cutting strips of cardboard out of the cardboard sheet, the cutting device including:

a pair of blades, movable orthogonally to the working plane from a raised position to a lowered position;

a transversal creaser interposed between the pair of blades;

a receiving member, having a pair of abutment surfaces and a slit interposed between the abutment surfaces, the slit being adapted to receive the blades in the lowered position, wherein the abutment surfaces are operatively in contact with cardboard portions arranged laterally to a strip of cardboard to be removed, and wherein the cardboard is operatively interposed between the pair of blades and the receiving member.

16. The apparatus according to claim 1, including:

a conveyor for conveying the items to be packed;

a sensor unit, configured for detecting size information representative of the size of each conveyed item, wherein the sensor unit is connected to the control unit to provide the input data responsive to the size information.

17. A method for processing corrugated cardboard sheet to produce pre-folded blanks, wherein each blank is tailorable for a respective item to be packed, the method comprising the following steps:

providing a plurality of cutters, configured to cut the cardboard sheet into the desired blank, and a plurality of creasers, configured to make crease lines in the cardboard sheet, to make a corresponding plurality of folding lines in the blank;

receiving, at a control unit, input data representative of the size of the item to be packed;

positioning the cutters and the creasers with respect to the frame, responsive to the input data;

loading the cardboard sheet from a cardboard reservoir;

moving the cardboard sheet on a working plane parallel to the ground, in an advancing direction oriented longitudinally;

activating the cutters and the creasers on the cardboard sheet, so that the blank is provided with a rear flap and a front flap, spaced along a longitudinal axis of the blank, and with a central portion, interposed between the rear flap and a front flap and delimited therefrom through a first and second folding line, respectively, the first and the second folding line being oriented transversally to the longitudinal axis of the blank;

applying a strip of glue on a portion of the blank;

folding the rear flap and the front flap, by rotation along the first and second folding line, respectively, so that the rear flap and the front flap are folded onto the central portion and partially overlapped at the tab of the front flap and attached to each other by the glue strip.

18. The method according to claim 17, wherein the rear flap and the front flap are folded on the central portion so that the front flap and the rear flap contact the central portion of the blank to form the pre-folded blank, the pre-folded blank being flat, wherein the method further includes a step of releasing the pre-folded blank at an outlet.

19. The method according to claim 17, wherein the rear flap is folded around the first folding line through a first folding hand which rotates around a first folding axis transversal to the longitudinal direction, wherein the front flap is folded through a second folding hand which rotates around a second folding axis transversal to the longitudinal direction, the method further comprising a step of adjusting a reciprocal position of the first and the second folding axis, responsive to the input data.

20. The method according to claim 19, and further comprising the following steps:

detecting the blank on the working plane;

stopping the movement of the blank responsive to the detecting step, so that the blank is arranged in a folding position wherein the first folding line and the second folding line of the blank are placed in a predetermined position with respect to the first and the second folding axis, respectively.

21. The method according to claim 17, wherein, during the folding step, a pushing action is provided underneath the rear and the front flap of the blank in proximity to the first and second folding axes, respectively, to lift the rear flap and the front flap of the blank from the working plane, and the central portion of the blank is held down to prevent lifting thereof from the working plane.

22. The method according to claim 17, and further comprising a step of separating the blank from the cardboard sheet, and wherein the step of applying the strip of glue is simultaneous with the step of separating the blank from the cardboard sheet.

* * * * *